United States Patent [19]

Burg

[11] Patent Number: 4,623,269
[45] Date of Patent: Nov. 18, 1986

[54] WHEEL BEARING PROTECTION APPARATUS

[75] Inventor: Thomas J. Burg, West Homestead, Pa.

[73] Assignee: Westinghouse Electric Corp., Pittsburgh, Pa.

[21] Appl. No.: 757,716

[22] Filed: Jul. 22, 1985

[51] Int. Cl.[4] .................. F16C 19/38; F16C 19/52
[52] U.S. Cl. .................................. 384/548; 384/624
[58] Field of Search ............ 308/1 A, 1 R; 384/101, 384/102, 416, 449, 461, 548, 586–589

[56] References Cited

U.S. PATENT DOCUMENTS

| | | | |
|---|---|---|---|
| 3,183,043 | 5/1965 | Creeger et al. | 308/1 A |
| 3,312,180 | 4/1967 | Mueller | 104/246 |
| 3,452,349 | 6/1969 | Wood | 308/1 R X |
| 3,508,241 | 4/1970 | Potter | 340/682 |
| 3,603,654 | 9/1971 | Bird | 384/102 |
| 3,854,781 | 12/1974 | Bildtsén | 384/102 |
| 3,880,479 | 4/1975 | DeFeo et al. | 384/129 |
| 4,015,882 | 4/1977 | Stenert | 308/1 A |
| 4,058,353 | 11/1977 | Frommlet et al. | 308/1 A |
| 4,063,786 | 12/1977 | Rall | 308/1 A |
| 4,425,010 | 1/1984 | Bryant et al. | 308/1 A X |

Primary Examiner—Stuart S. Levy
Assistant Examiner—Thomas R. Hannon
Attorney, Agent, or Firm—E. F. Possessky

[57] ABSTRACT

The rotatable guide wheel of a transit vehicle is supported by a vertical stationary shaft by at least one main support bearing. Upon failure of that main support bearing the guide wheel shifts position for operation with one of a sleeve bearing coupled with the shaft and a thrust bearing coupled with the shaft below the guide wheel.

6 Claims, 4 Drawing Figures

PRIOR ART FIG. 2

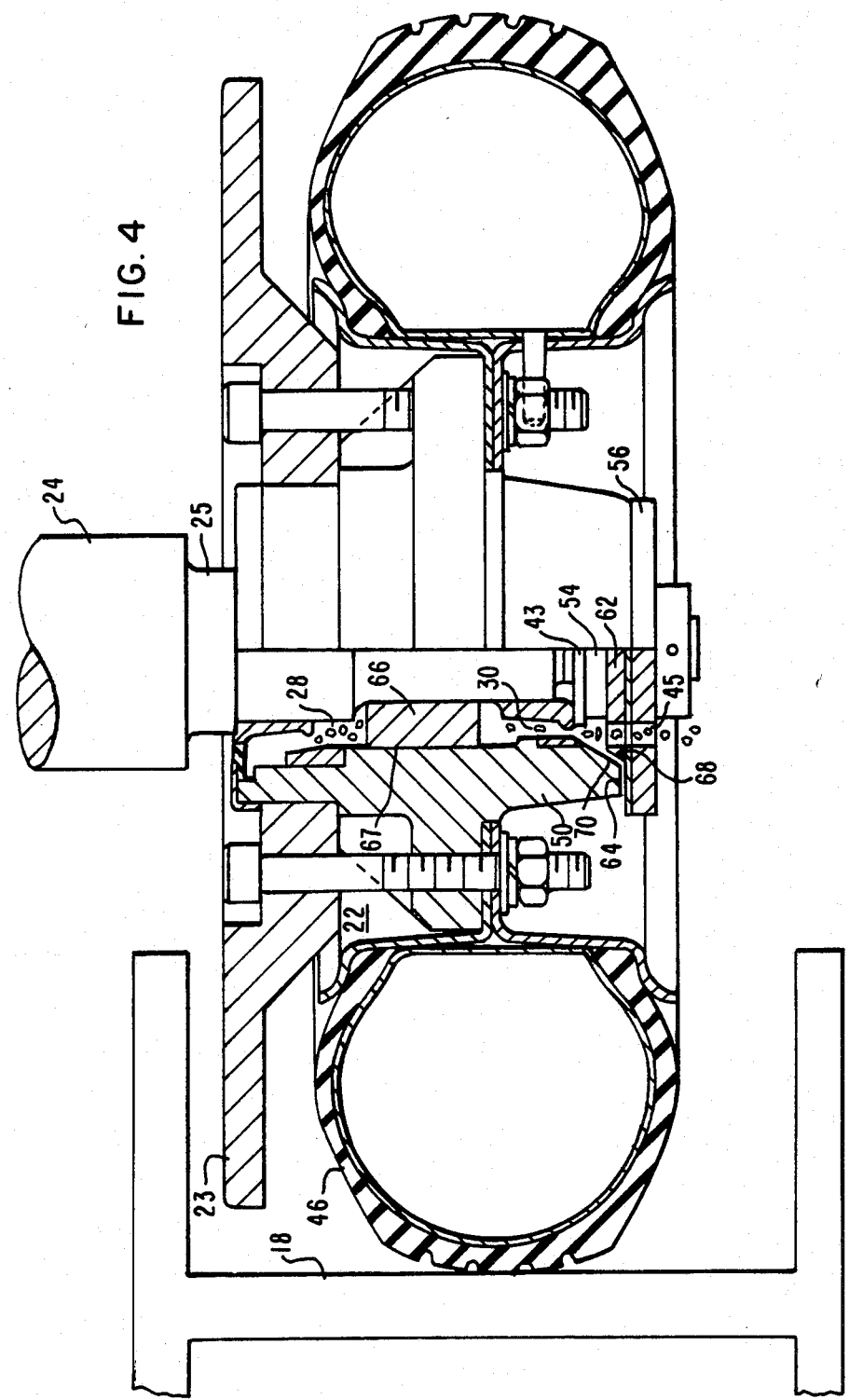

ced bearings 28 and 30.

WHEEL BEARING PROTECTION APPARATUS

BACKGROUND OF THE INVENTION

It is known in the prior art to provide a self-lubricating auxiliary bearing with a failure indicator as shown by U.S. Pat. No. 4,063,783 of M. E. Rall. A rotatable shaft is normally supported by a main bearing and upon failure of that main bearing an auxiliary bearing member including a self-lubricating sleeve becomes engaged by a runner carried by the shaft. The resulting movement of the runner and shaft in relation to the auxiliary bearing sleeve operates to provide an alarm indication of the main bearing failure.

SUMMARY OF THE INVENTION

The guide wheel assembly of a transit vehicle includes a stationary and vertical shaft on which is provided main bearings for rotatable support on a horizontally positioned guide wheel. A lock nut assembly is coupled with the shaft below the position of the main bearings and includes a thrust bearing surface that the wheel engages upon failure of the main bearing. In addition, a radial load carrying sleeve bearing is provided concentric with the shaft at a position between the upper and lower main bearings to support the radial load on the wheel upon failure of either or both main bearings, permitting continued safe operation until detection and corrective maintenance.

BRIEF DESCRIPTION OF THE DRAWINGS

FIG. 4 shows a second embodiment of the guide wheel with the main bearings failed and the support bearing apparatus of the present invention engaged.

DESCRIPTION OF PREFERRED EMBODIMENTS

Figure 1:
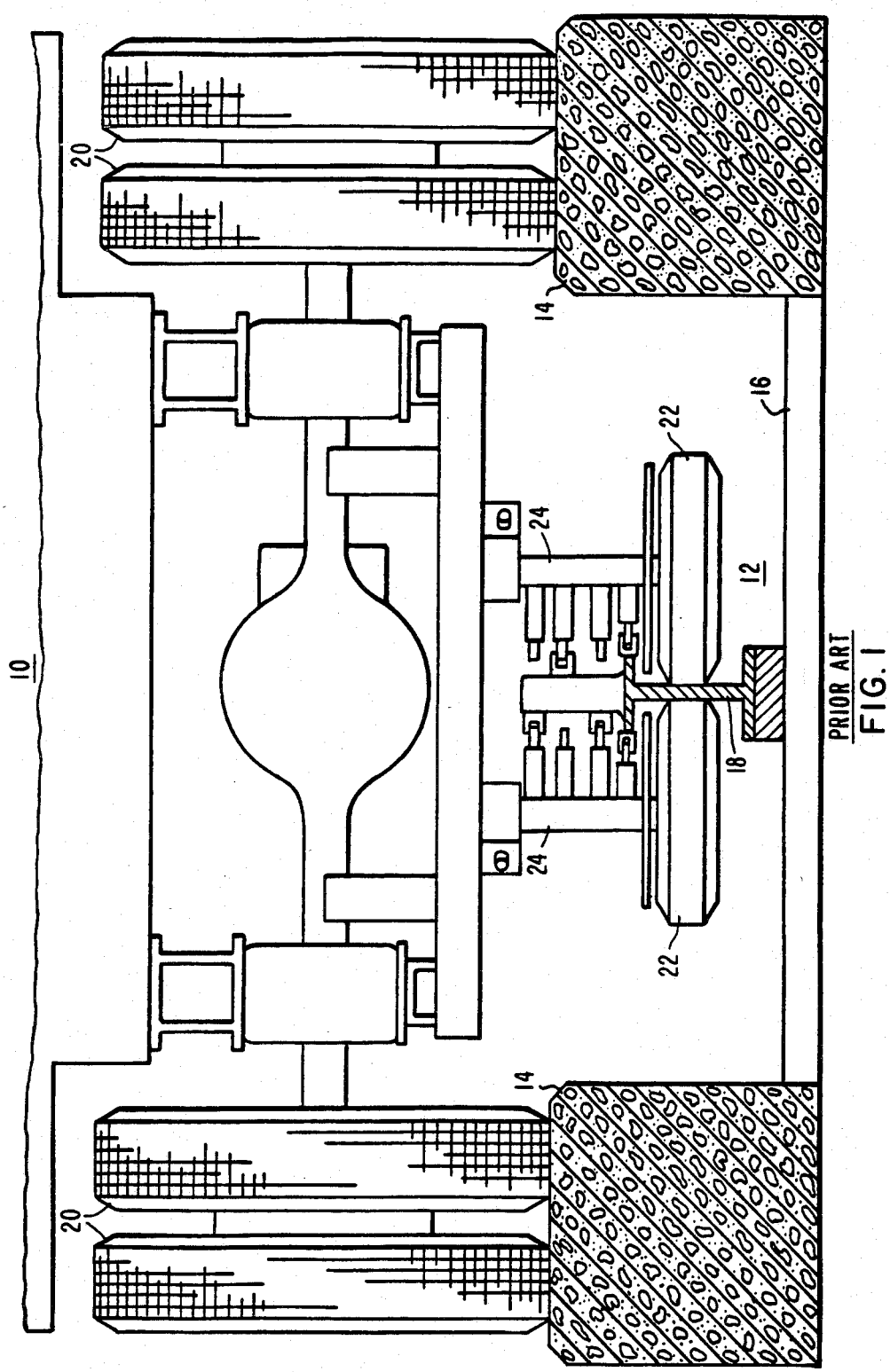
FIG. 1 shows a prior art self-guiding transportation vehicle including guide wheels rotatably mounted on vertical shafts.

In FIG. 1 there is shown a transverse section of a prior art self-guiding transit vehicle 10 operative with a roadway 12 as disclosed in U.S. Pat. No. 3,312,180 of E. O. Mueller. The roadway 12 includes two spaced tracks 14 which support the vehicle 10. For guiding the vehicle a cross-member 16 supports an I-shaped guide rail 18 coextensive with the roadway 12. The vehicle 10 includes support wheels 20 which run on the tracks 14. Guide wheels 22 are rotatably supported by vertical shafts 24 carried by the vehicle 10 such that the guide wheels 22 engage opposite sides of the guide rail 18.

Figure 2:
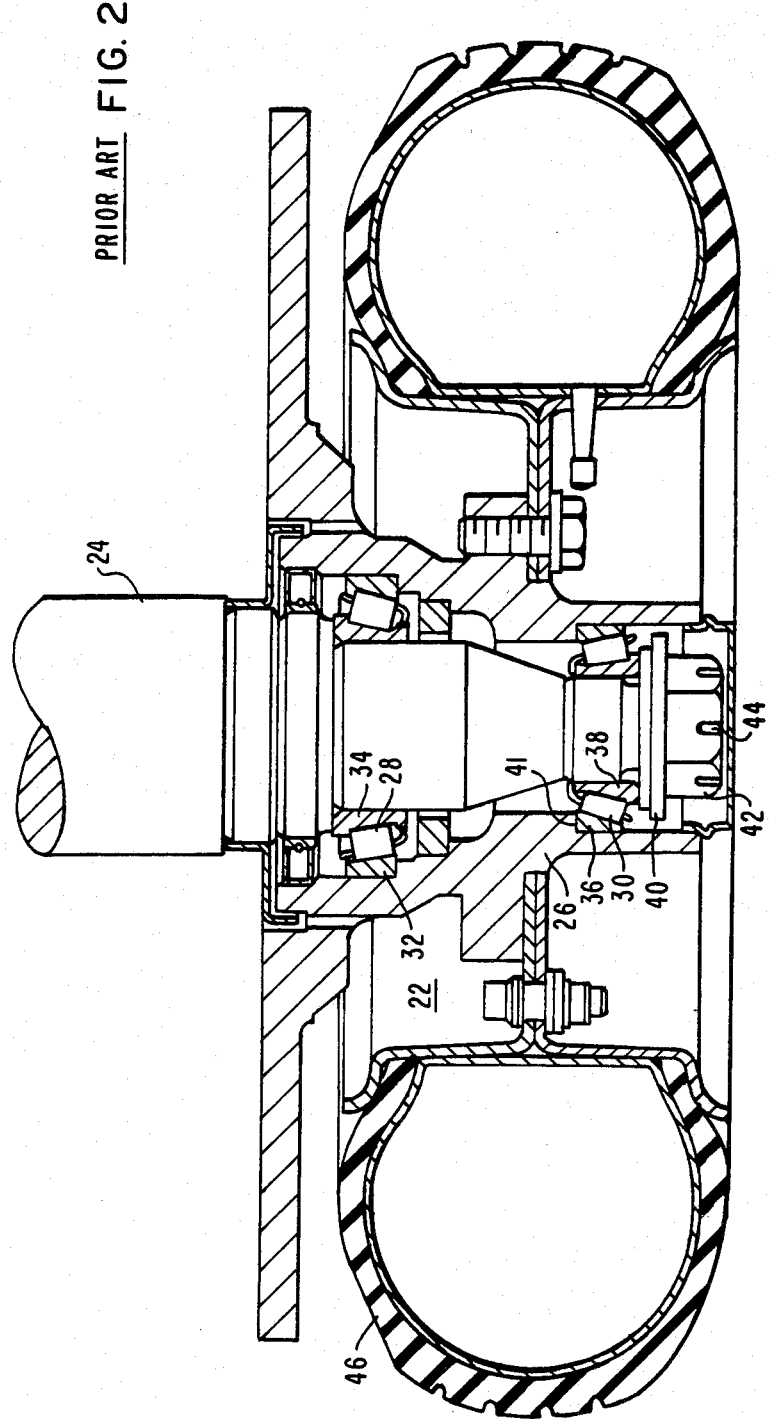
FIG. 2 shows a prior art guide wheel support bearing apparatus.

In FIG. 2 there is shown a prior art guide wheel support bearing apparatus operative with a vertical shaft 24. The guide wheel 22 includes a hub member 26 operative with an upper roller bearing 28 and a lower roller bearing 30 coupled with a shaft 24. The upper bearing 28 includes an outer race 32 and an inner race 34. The lower bearing 30 includes an outer race 36 and an inner race 38. At the lower end of the vertical shaft 24 there is provided a retaining washer 40 and a restraint lock nut 42 including a lock pin 44 passing through the nut 42 and the end of the shaft 24 as well known to persons skilled in this art. The wheel 22 includes the pneumatic or solid rubber tire 46. Upon failure of the roller bearings 28 and 30 the wheel hub 26 will drop down with the surface 41 in contact with the upper surface of the washer 40 and eventually and bearing pieces will grind away the washer 40 until the wheel 22 drops off the lower end of the shaft 24.

Figure 3:
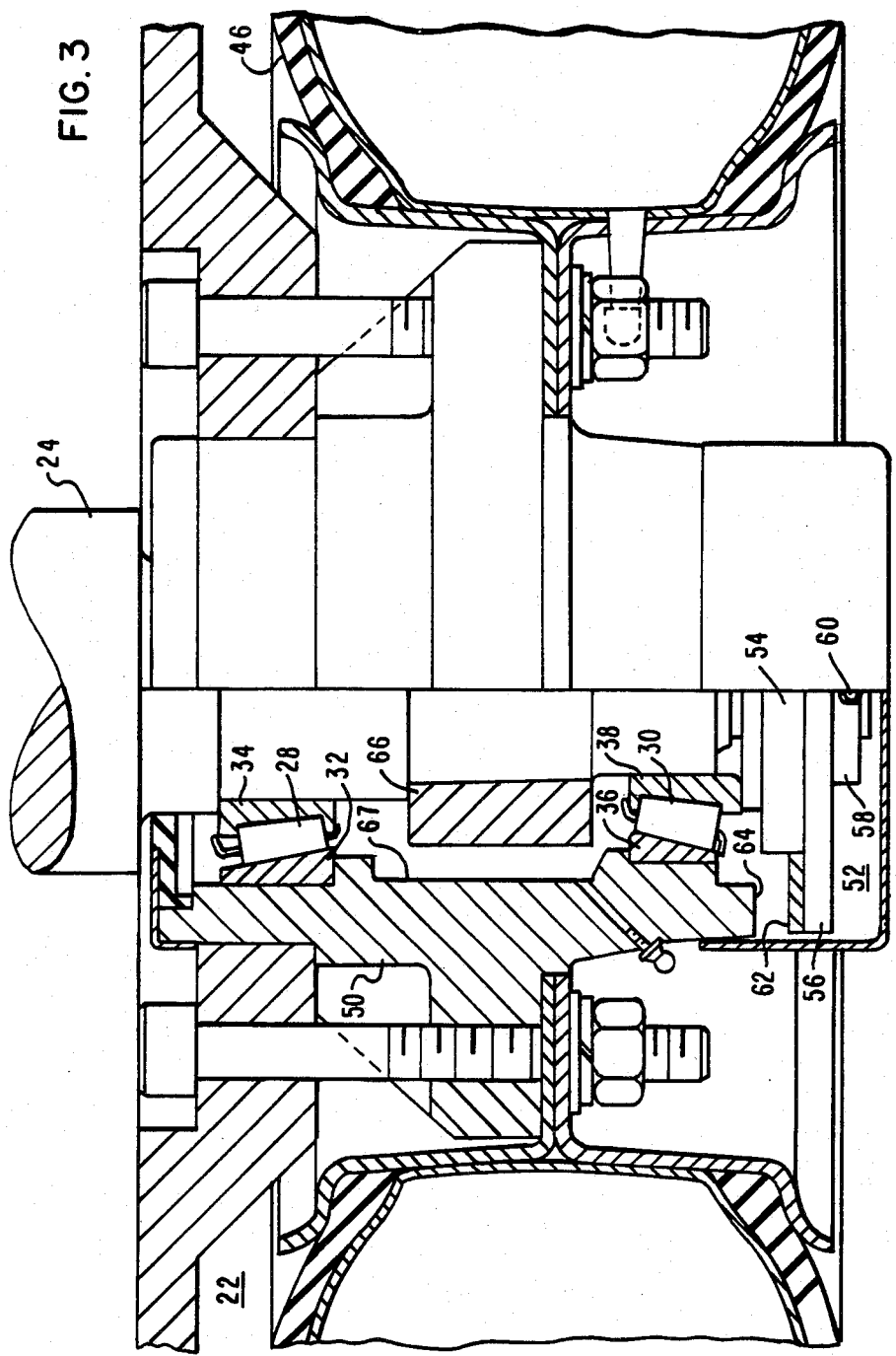
FIG. 3 shows one embodiment of the guide wheel support secondary or auxiliary bearing apparatus of the present invention.

In FIG. 3 there is shown one embodiment of the guide wheel support bearing apparatus of the present invention. The guide wheel 22 includes a hub member 50 operative with an upper roller bearing 28 and a lower roller bearing 30 coupled with the shaft 24. The upper bearing 28 includes an outer race 32 and an inner race 34. The lower bearing 30 includes an outer race 36 and an inner race 38. At the lower end of the vertical shaft 24 there is provided a restraint lock nut 52 including a first section 54 having a first diameter and a second section 56 having a second and larger diameter with a castellated section 58 operative with a lock pin 60 extending through the nut 52 and the end of the shaft 24. A first thrust bearing 62 is press fitted around the first section 54 in contact with the upper surface of the second section 56 and is operative with a surface 64 of the hub member 50 upon failure of the upper and lower roller bearings 28 and 30. A second radial bearing 66 is positioned in relation to the shaft 24, and operative with the surface 67 of the hub member 50 upon failure of one or both of the upper and lower roller bearings 28 and 30. The bearings 62 will support the wheel 22 upon failure of the bearings 28 and 30 for an extended period of time long enough to permit the scheduled maintenance operations to detect the failed main bearings 28 and 30 before the wheel 22 drops off the vehicle support shaft 24. The washer 43 holds the inner race 38 of the lower roller bearing 30. If desired, one or more holes 45 can be provided through the second section 56 and the thrust bearing 62 to provide a removal path for the broken metal pieces and other debris from the failed main bearings 28 and 30.

In FIG. 4 there is shown a second embodiment of the guide wheel support bearing apparatus of the present invention. The guide wheel 22, including the hub member 50, is shown dropped down in position upon the failure of the upper and lower roller bearings 28 and 30. The surface 64 of the hub member 50 is shown in contact with the first thrust bearing 62. The first thrust bearing 62 included a beveled surface 68 operative with a beveled surface 70 of the hub member 50. The second radial sleeve bearing 66 is shown in contact with the surface 67 of the hub member 50 in response to a radial load applied to the tire 46 in a direction to move the surface 67 against the second radial bearing 66.

As shown in FIG. 4, the sleeve bearing 66 and the thrust bearing 62 can be made of an oil impregnated brass material available in the open market as Oilite, which will resist damage due to the fractured portions of the main bearings 28 and 30, rollers and cage interacting with these secondary bearings 62 and 68. These fractured particles will tend to migrate to the bottom of the assembly through the opposite side of the sleeve bearing 66 contact surface which now has an opening at least twice the post failure clearance.

The manual detection of excess wobble or noise by the wheel 22 upon failure of the main bearings 28 and 30 will occur prior to catastrophic failure of the secondary bearings 62 and 66. If desired, one method of detection of failure of the roller bearings 28 and 30 could be with a suitable noncontact sensor provided to monitor the gap between the safety disc 23 and the upper portion of the shaft 24. In addition, if desired, the shaft surface 25 can be painted with a bright color, such as red or orange, to visually indicate to an observer the dropping of the wheel 22 to the position as shown in FIG. 4.

Upon failure of the main bearings 28 and 30 of a transit vehicle guide wheel assembly as shown in FIG. 4, the hub 50 will engage a radial load carrying sleeve bearing 66 and drop to engage a thrust bearing 62 for allowing an extended period of continued service. The displacement of the hub 50 upon main bearing failure will readily enunciate that failure due to the relatively large magnitude of movement of the wheel 22 in time for corrective action at the next scheduled vehicle maintenance. The radial load on the failed guide wheel bearing assembly is reduced because the effective rotating center of the wheel 22 has shifted away from the running surface of the I-shaped guide rail and the wheel 22 has shifted away from the running surface to provide radial clearance of the secondary radial bearing 66, which bearing 66 then carries the radial load of the wheel 22. The guide wheel 22 causes the wheel hub to engage the thrust bearing 62 as shown in FIG. 4.

What is claimed is:

1. In transit vehicle apparatus for supporting a vehicle guide wheel generally in a horizontal plane relative to a vertically extending stationary vehicle shaft, the combination of:
   first bearing means coupled between a hub of said guide wheel and said stationary shaft for providing support of said wheel against horizontally directed forces and gravitational forces;
   second bearing means coupled with said stationary shaft for providing horizontal support of said wheel hub upon failure of said first bearing means, and
   separate thrust bearing means coupled with said shaft for providing upward vertical support of said wheel hub upon failure of said first bearing means.

2. The apparatus of claim 1, including means coupled with said shaft and positioned below said first bearing means for determining the vertical position of said first bearing means.

3. The apparatus of claim 1, with said first bearing means including at least two roller bearings, with said second bearing means including a radial bearing and with said thrust bearing means including a thrust bearing supported near the lower end of said shaft to hold said guide wheel on said shaft when said first bearing means fails.

4. The apparatus of claim 1, including a threaded lock nut member coupled with said shaft and positioned below said first bearing means for providing vertical support of said first bearing means and the rotating member.

5. The apparatus of claim 1, including support means coupled with said shaft and operative to provide support for said first bearing means and the rotating member in relation to said shaft, with said support means including a support surface operative with said thrust bearing means and spaced below said rotating member such that the rotating member becomes operative with said thrust bearing means upon failure of said first bearing means.

6. In transit vehicle apparatus for supporting a horizontally rotating vehicle guide wheel in relation to a stationary vertical shaft about which it is rotated, the combination of
   first bearing means positioned between a hub of said guide wheel and the shaft for providing horizontal and vertical support of said guide wheel,
   support means coupled with said shaft to provide support for said first bearing means and further having a bearing support surface below a surface on the wheel hub, and
   thrust bearing means coupled with said bearing support surface and operative to provide vertical support for said wheel hub surface upon a failure of said first bearing means.

* * * * *